Feb. 16, 1965 P. HOLD 3,169,323
DIFFERENTIAL ELECTRONIC ROLL CALIPER
Filed May 31, 1961 2 Sheets-Sheet 2
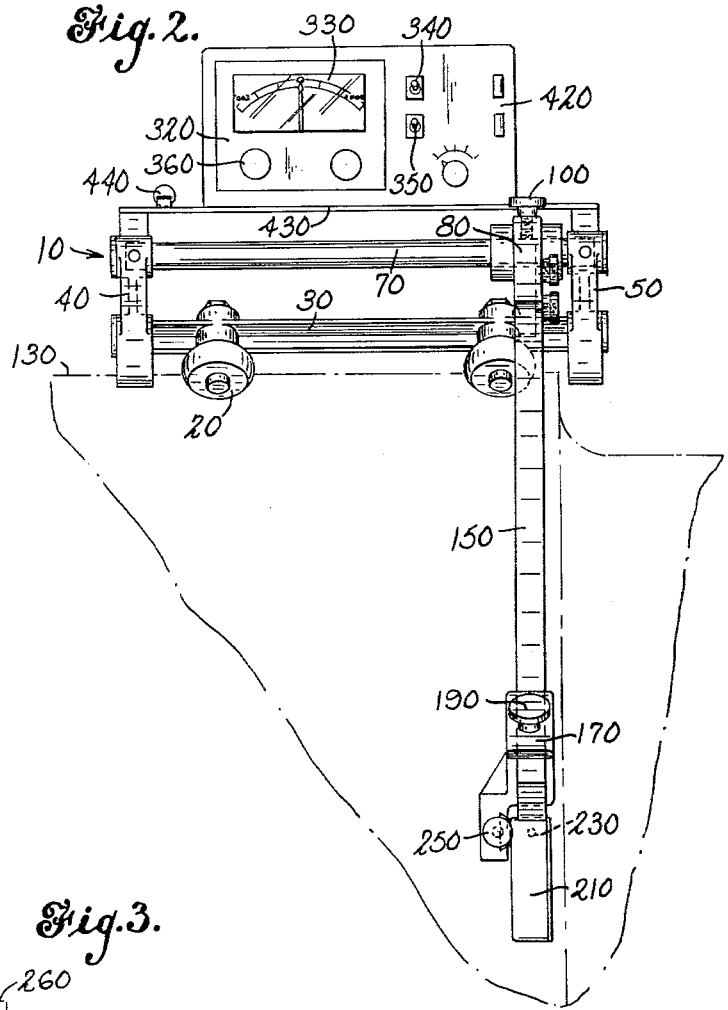
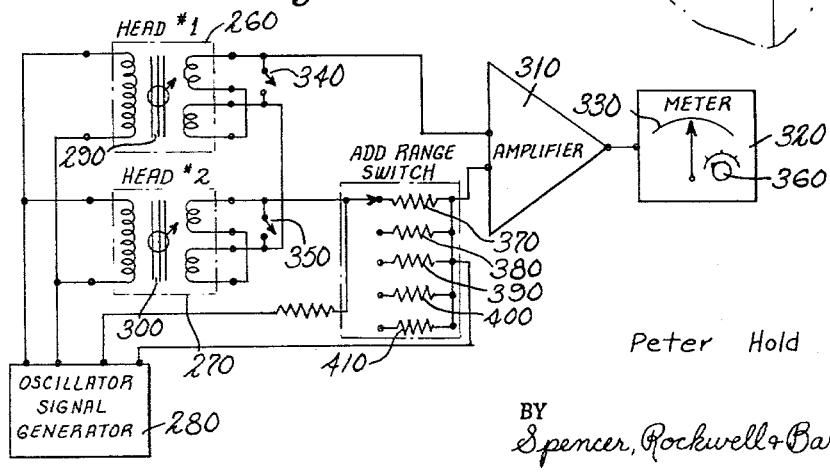
INVENTOR
Peter Hold
BY
Spencer, Rockwell & Bartholow
ATTORNEYS 3,169,323
DIFFERENTIAL ELECTRONIC ROLL CALIPER
Peter Hold, Milford, Conn., assignor to Farrel-Birmingham Company, Incorporated, Ansonia, Conn., a corporation of Connecticut
Filed May 31, 1961, Ser. No. 113,749
3 Claims. (Cl. 33—147)

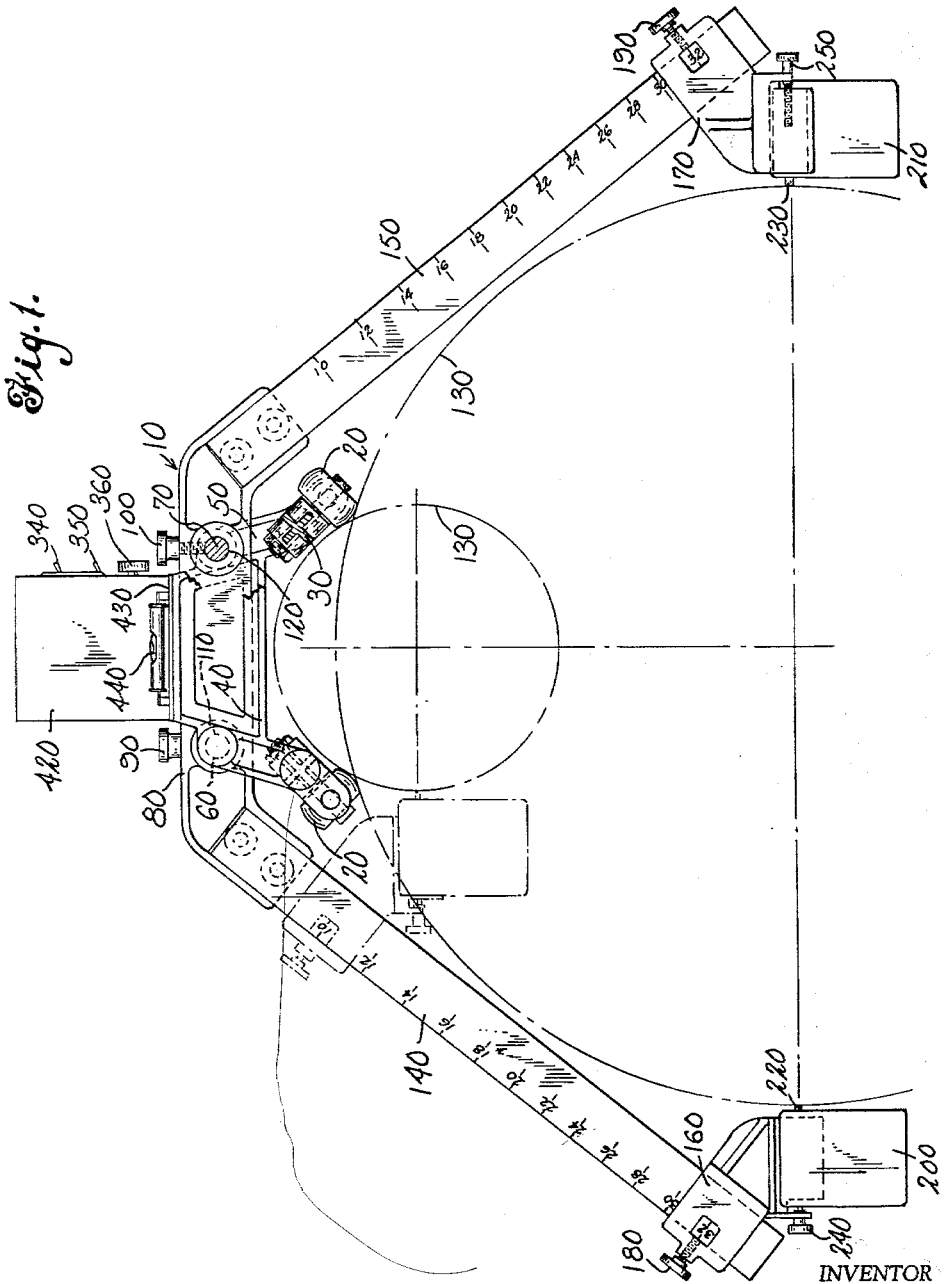

This invention relates to roll calipers and more particularly to a roll caliper utilized in measuring the diameter of cylindrical surfaces such as paper mill rolls, shafts, bearings, crank pins and the like.

Heretofore, as described in United States Letters Patent No. 1,845,199, granted to C. F. Schnuck on February 16, 1932, the calipers conventionally in use comprise a cradle adapted to rest on a cylindrical surface to be measured, and having pivotally mounted thereon a pair of integrally formed graduated arms, each having a downwardly extending slide supported thereon with one arm provided with an indicator, such as a micrometer, and the other provided with a cooperating measuring point. As set out in the aforesaid patent, the cradle is adapted to rest on the surface for longitudinal movement thereon by means of four rolls which permit the rolling of the caliper unit along a cylindrical surface. In measuring a cylindrical surface of a roll the measuring points are adjusted toward and away from the cradle simultaneously with their adjustment toward and away from each other so as to dispose the measuring points at diametrically opposed points on the surface of the cylindrical object. In the measuring of cylindrical surfaces, such as rolls having a crown thereon, it is customary to roll the caliper along the roll to gauge the diameter of the roll at various points or to indicate the taper from one point to another.

Although the above-described calipers provide a convenient means for measuring the diameter of cylindrical surfaces they nevertheless suffer from the disadvantage of utilizing the direct translation of a mechanical movement train into a direct visual reading. Accordingly such calipers reflect the permissible and inherent tolerances of the various elements comprising the train which are consequently reflected in the visual readings resulting in a distinct disadvantage where extreme precision is required in the measurement of rolls.

Accordingly it is an object of this invention to provide a novel caliper eliminating the disadvantages of the prior art.

It is also an object of this invention to provide a novel caliper for measuring cylindrical surfaces, such as rolls, shafts and the like with precision.

It is a further object of this invention to provide a novel caliper adapted to translate dimensional variations of a cylindrical surface to a corresponding electrical signal which is converted into a visual reading.

Other objects and advantages will become more apparent from the following description and drawings in which FIG. 1 is an end view of a caliper in accordance with one embodiment of this invention mounted on a cylindrical surface;

FIG. 2 is an elevational view of the embodiment illustrated in FIG. 1; and

FIG. 3 is a schematic view illustrating an electronic circuit adapted to be employed in conjunction with the aforesaid embodiment.

Generally speaking, the invention comprehends a cradle or framework which rests upon a cylindrical surface by means of four rollers to permit rolling of the cradle along the top of the surface longitudinally thereof. Supported on the cradle in fixed radial relationship to the surface are a pair of integrally and downwardly extending arms receiving and straddling the cylindrical surface therebetween. Adjustably mounted on the arms is an electric signal emitting means having a signal modifying means mounted in the emitting means and in contact with the cylindrical surface. The modifying means is adapted to be actuated in response to dimensional variations of the cylindrical surface when the cradle is moved longitudinally thereon so that the modifying means provides a corresponding modification of the signal of the emitting means. The modified signal from the emitting means is then converted by conventional translating means into a visual reading.

More specifically and by reference to the drawings a cradle 10 of substantially oblong form is adapted by means of four rollers 20 to rest on a cylindrical surface 130, such as a roll to be measured, for longitudinal movement thereon. The rollers, which are mounted in pairs on corresponding longitudinal members 30 are located intermediate the ends of the cradle 10 to provide end portions of the cradle overhanging the rollers. Extending upwardly from the corresponding ends of the members 30 are a pair of cross pieces 40 and 50 having fixedly mounted therein a pair of parallel shafts 60 and 70 which are arranged so that their axes are parallel to the axis of a cylindrical object to be measured. The overhang of cradle 10 beyond rollers 20 permits measuring of the end of the cylindrical surface without the necessity of bringing a pair of the rollers 20 to such an end as will be manifest hereinafter.

Slidably mounted on shafts 60 and 70 in a plane at right angles to the axes thereof is a cross-bar 80 which is adapted to be secured on the shaft by means of set screws 90 and 100. The cross-bar is mounted on the shafts by means of corresponding bores 110 and 120 through which, respectively, the shafts are inserted to dispose the cross-bar in fixed radial relationship to the cylindrical surface to be measured, indicated at 130. Extending downwardly from the corresponding ends of the cross-bar 80 are integral measuring arms 140 and 150 which may be arranged at an angle approaching 90 degrees and adapted to straddle the cylindrical surface to be measured. On arm 140 is a slide 160 to slide therealong. A similar slide 170 is provided on arm 150. The slides 160 and 170 are provided with thumb screws 180 and 190, respectively, to secure the slides fixedly on their respective arms in any desired position of adjustment. Each of the arms is provided with lengthwise graduations while each slide mounted thereon is provided with an appropriate reference point or line for registering with the selected graduations of the arm.

The function of the shafts 60 and 70 is to fix the cross-bar 80 and the integrally extending arms 140 and 150 in radial relationship to the cylindrical surface 130 in accordance with the preferred embodiment of this invention. However, it is to be understood that other equivalents providing this same function may be employed.

Slides 160 and 170 serve as a mounting means to support thereon signal emitting means 200 and 210, respectively, which have mounted therein signal modifying means 220 and 230, respectively, disposed in contact with substantially diametrically opposed points on the cylindrical surface 130 by means of adjustment of slides 160 and 170 on the corresponding arms. The signal emitting means 200 and 210 are adapted for adjustable movement toward and away from each other by means of set-screws 240 and 250, respectively. In the preferred embodiment of this invention the signal emitting means 200 and 210 comprise magnetic (FIG. 3) measuring heads 260 and 270, respectively, of the linear transducer type, well known in the art, to which an electrical signal is fed by means of an oscillating signal generator 280. The signal received in each of heads 260 and 270 is modified by means of linearly movable cores 290 and 300 slidably mounted therein. These cores are actuated and positioned by the dimensional variations of the cylindrical surface being measured as the cradle is moved longitudinally thereon and modify the signals emitted from the transducer heads 260 and 270 in accordance with their position. The emitted signals from each of the heads is then amplified by means of a conventional electronic or transistor amplifier 310 with the amplified signal fed to a conventional meter 320 for converting the received signal to a visual reading on a dial 330.

To adjust the instrument for the measurement of a specific cylindrical object, such as a roll, the caliper is set on the roll and the signal emitting means 200 and 210 are set on the arms in accordance with the roll diameter. Thereafter the emitting means 200 is adjusted mechanically by means of set screw 240 directly toward or away from the roll with switch 340 (FIG. 3) closed until a reading is obtained somewhere on the scale of dial 330. The signal emitting means 210 is similarly adjusted by set screw 250 with switch 350 closed and switch 340 open. Thereafter both of the switches are closed and a reading is obtained at the zero point of the indicator dial 330 by means of a zero setting knob 360.

When the above-described adjustments have been completed the caliper is ready to indicate roll diameter changes as the caliper is moved longitudinally back and forth along the length of the cylindrical object. As indicated above, the dimensional variations of the surface of the cylindrical object actuates cores 290 and 300 within their respective transducer heads to modify the signal transmitted thereto and which is emitted from the heads, amplified and sent to meter 320 for visual translation on scale 330. It has been found that since some of the cylindrical objects or workpieces have a contour which is greater than a normal range of the indicating dial 330, provision must be made for compensation. Accordingly, for the measurement of such objects, use is made of "add" range circuitry comprised of a series of resistors 370, 380, 390, 400 and 410 which are introduced into the circuit successively one after the other, as required, so as to add a known increment to the original dial reading. Electrically this involves subtracting a predetermined amount from the output of the signal emitting means to bring the net output back within the range of the indicator dial. In practice, these additions are usually some small amount, such as 0.004, 0.005, or 0.010 inch depending upon the degree of precision incorporated in the electrical measuring components of the instrument.

For convenience the switches 340 and 350, the "add" range resistors, amplifier and the meter may be combined in a single chassis 420 which may be mounted on a platform 430 secured on the cross pieces 40 and 50 and straddling cradle 10. In order to facilitate measurement of the diameter of a roll in a horizontal plane, a level 440 may be mounted on platform 430 to provide a visual indication of proper positioning of the caliper on the cylindrical surface.

In operation of the caliper the slides 160 and 170 may be adjusted to measure any particular diameter by adjusting them to the appropriate graduations provided on the extending arms 140 and 150. To adapt the calipers to measuring rolls of such diameter the angle between arms 140 and 150 is such that the signal emitting means 200 and 210 are always disposed at diametrically opposite points of a roll when the caliper is supported on and adjusted to the roll. In FIG. 1 the caliper is shown in two positions, one in full lines in which it is adjusted to the largest roll that the caliper is capable of measuring, and the other in broken lines in which it engages the smallest roll.

Accordingly when it is desired to measure rolls of different diameters it is simply necessary to adjust the slides 160 and 170 along the arms 140 and 150 so as to dispose the signal emitting means at diametrically opposed points on the surface of the roll followed by calibrating the signal emitting means to the roll as described above.

It is pointed out that the actual diameter of a roll is not required to be measured ordinarily; instead it is the common practice in the art to measure only the change in roll diameter at successive points along the surface or face of the roll. However, it may be pointed out that the actual diameter can be measured if a standard measure is introduced between the signal emitting means before the instrument is utilized for measuring the diameter of the roll in question. It is again pointed out that actual diameter is rarely necessary.

While a preferred embodiment of the invention has been shown, it is to be understood that the same is not to be limited to the specific details shown since the invention is capable of modification and variation within the spirit and scope of the invention. For example, although a pair of signal emitting means have been described in the measurement of cylindrical objects, it is possible to utilize only a single signal emitting means when the measurement of surface variation is desired only along a single longitudinal area along the surface of the cylindrical object.

Also, the signal emitting means utilized in this invention may be comprised of conventional electrical resistor strain gauges which, as will be recognized, are conventionally employed for modifying an electrical current in response to deflections induced in the strain gauge.

As noted above, although the invention has been described with reference to a specific embodiment, various modifications and changes will be apparent to one skilled in the art. The invention is, therefore, not to be limited by such an embodiment except as set forth in the appended claims.

What I claim is:

1. A caliper for measuring the diameter of cylindrical objects comprising a cradle, roller means for supporting said cradle on the surface of said object for moving said cradle longitudinally along the surface of the cylindrical object, a pair of caliper arms extending outwardly from said cradle and arranged to receive the object therebetween, and arm support means mounted on said cradle and arranged to hold said arms in fixed radial relationship to the surface of the object, said support means longitudinally extending beyond said roller means at either end of said cradle, said arms being movable longitudinally on said support means to positions beyond said roller means at either end of said cradle.

2. The caliper of claim 1 including surface engaging means slidably and adjustably receivable on each of said arms to position said engaging means at diametrically opposed points with respect to the object.

3. A caliper for measuring the diameter of a cylindrical object comprising a cradle, roller means supporting said cradle on the surface of the object for longitudinal movement along the axis thereof, a pair of caliper arms disposed at a fixed angle to each other and extending downwardly from said cradle with said arms being arranged to receive the object therebetween, means mounting said arms on said cradle in fixed radial relation to the object, electric signal generating means mounted on said cradle, signal modifying means, support means for said modifying means slidably receivable on each of said arms and adapted to dispose said modifying means adjacent diametrically opposed points on the object, said modifying means including movable detecting means adapted to contact the object at said diametrically opposed points, said detecting means being movable in response to surface variations in the object upon movement of said cradle along the object to provide for the emission of a modified signal from said modifying means corresponding to the variations, and translating means for converting the modified signal to a visual representation, said mounting means extending beyond said roller means at either end of said cradle so that said caliper arms are movable longitudinally on said mounting means beyond said roller means at either end of said cradle.

References Cited in the file of this patent

UNITED STATES PATENTS

| | | |
|---|---|---|
| 764,203 | Perkins | July 5, 1904 |
| 1,635,908 | Stuart | July 12, 1927 |
| 1,845,199 | Schnuck | Feb. 16, 1932 |
| 2,122,664 | Terry | July 5, 1938 |
| 2,477,399 | Aller | July 26, 1949 |
| 2,622,331 | Haines | Dec. 23, 1952 |
| 2,827,787 | Kroeger | Mar. 25, 1958 |
| 2,876,551 | Bowlby | Mar. 10, 1959 |
| 3,100,889 | Cannon | Aug. 13, 1963 |

FOREIGN PATENTS

| | | |
|---|---|---|
| 554,338 | Germany | July 6, 1932 |